Sept. 8, 1970     V. G. CONVERSE III, ET AL     3,527,087

AUTOMATED ENGINE TEST CONVEYOR

Filed March 29, 1968     6 Sheets-Sheet 1

INVENTORS
VERNON G. CONVERSE III.
GEORGE R. ALLINGTON
PETER J. MOSHER
LEE J. SEYMOUR

BY Gregory S. Dolgoruko
ATTORNEY

Sept. 8, 1970  V. G. CONVERSE III, ET AL  3,527,087
AUTOMATED ENGINE TEST CONVEYOR Filed March 29, 1968  6 Sheets-Sheet 2

INVENTORS
VERNON G. CONVERSE III.
GEORGE R. ALLINGTON
PETER J. MOSHER
LEE J. SEYMOUR

BY Gregory S. Dolgorukov
ATTORNEY

INVENTORS
VERNON G. CONVERSE III.
GEORGE R. ALLINGTON
PETER J. MOSHER
BY LEE J. SEYMOUR

Gregory S. Dolgorukov
ATTORNEY

Sept. 8, 1970    V. G. CONVERSE III, ET AL    3,527,087
AUTOMATED ENGINE TEST CONVEYOR Filed March 29, 1968

INVENTORS
VERNON G. CONVERSE III.
GEORGE R. ALLINGTON
PETER J. MOSHER
BY LEE J. SEYMOUR

Gregory S. Dolgoruko
ATTORNEY

FIG. 12

INVENTORS
VERNON G. CONVERSE III
GEORGE R. ALLINGTON
PETER J. MOSHER
BY LEE J. SEYMOUR

Gregory S. Dolgorukov
ATTORNEY

United States Patent Office 3,527,087
Patented Sept. 8, 1970

3,527,087
AUTOMATED ENGINE TEST CONVEYOR
Vernon G. Converse III, Franklin, George R. Allington, Westland, Peter J. Mosher, Livonia, and Lee J. Seymour, Farmington, Mich., assignors to Scans Associates, Inc., Livonia, Mich., a corporation of Michigan
Continuation-in-part of application Ser. No. 707,033, Feb. 21, 1968. This application Mar. 29, 1968, Ser. No. 717,103
Int. Cl. G01m *15/00*
U.S. Cl. 73—117.3
6 Claims

ABSTRACT OF THE DISCLOSURE

This application discloses an automation system whereby a number of different machines, test stands, and the like previously operated as separate machines or installations are grouped together with the aid of an accumulator conveyor system into a unitary system operating substantially as a single machine, with the operators merely loading and unloading workpieces at a predetermined place or station. The application discloses as a particular example an installation for combining into a single installation a number of test stands and machines directed to testing automobile engines, as well as operations related to such tests, such as filling the engines with oil, balancing the engines, hot-run testing the engines, removing rejected engines from the installation and directing them to repair stands and the like, and dynamometer load testing. The construction utilizes the non-positive accumulator conveyor such as disclosed in detail in our co-pending application identified below. In some of its aspects the present invention relates to an improved method of automating industrial plants or portions of such plants to provide for operation of such plants or portions thereof formerly composed of a large number of independent units, machines or devices as single systems.

---

The present application is a continuation-in-part of the application of Vernon G. Converse III; George R. Allington; and Peter J. Mosher, Ser No. 707,033, filed Feb. 21, 1968 for Accumulator Conveyor System.

This invention relates to automation systems and more particularly to an automation system including a conveyor whereby a group of different machines, test or processing stations, and the like can be converted into a unitary system for performance therein of a plurality of different operations in a predetermined sequence thereof, and thus providing for an improved method of automation of industrial plants.

At the inception of quantity production, workpieces were transferred or moved from machine to machine manually, and at each such station or machine after the opeartion was performed on a workpiece, the workpiece was transferred to the next machine. Since the time required for performance of each separate operation was not the same from machine to machine, in order to have continuous production without machines with the shortest operation standing idle part of the time, some storage space had to be provided adjacent slower machines, i.e. machines requiring more time for the completion of their respective operations, and unprocessed workpieces would be permitted to accumulate at such station and were piled up or stacked up at such machines. Since such accumulation process could not be permitted to continue uncorrected, the slower machines had to be opearted for additional periods of time to permit processing or performing operations on the accumulated workpieces. This could be done only if production capacities of separate machines varied only slightly. However, when the manufacturing process included machines or stations which required time in multiples of the time required by the fastest machines such as two, three or more times, two, three or more of such slower machines had to be used for performance of operations requiring more time. In such arrangements, use of the conveyors was limited substantially to moving workpieces from one machine to the other, usually unloading such workpieces in front of separate machines.

In cases where the number of machines performing similar operations had to be increased to a considerable number such as twenty or thirty, it was thought to be of advantage to organize such machines into a separate unit and to provide a conveyor which would provide each vacant machine or station with a workpiece for processing and for returning the processed pieces to the conveyor for delivery of such workpieces to an unloading station where an unprocessed piece could be loaded on the conveyor and carried past the working stations for transferring to the first vacant machine or station. Such operations could be and were performed by hand with the operators recognizing unprocessed workpieces by visual examination, often aided by such means as a chalk mark, a special tag and the like.

U.S. Pat. No. 2,884,113, in which Vernon G. Converse III, one of the applicants herein, was a co-inventor, disclosed a construction provided with signal and actuating means whereby such identical workpieces were loaded on the conveyor and positively engaged thereon at uniform intervals, were automatically moved to the working stations, and upon completion of operations were automatically returned to the conveyor for delivery to the unloading station. That particular application was intended for running tests of gasoline engines. In that particular system all of the workpieces carried by the conveyor were of exactly the same nature intended to be placed on one of a plurality of identical stations for performance of similar operations and thereupon for delivery to the unloading station.

In other words, the entire system discolsed in the above patent was intended to unite a group of identical machines or stations into a single group served by the same conveyor. Such a system, in spite of considerable merits possessed thereby, did not satisfy and did not provide a solution to the problems involved and did not contribute to the further progress in the field as much as expected. It is our belief that it was due to the fact that such system did not provide a prerequisite for the next step in automation of industrial plants. Such prior systems were not capable of serving a group of different machines performing different operations on workpieces, particularly in a desired sequence, and thus to organize into unit or units portions of manufacturing plants comprising a plurality of different machines. Such deficiency stood in the way of having some portions of the plant operate automatically and thus lead the way to more complete automation of industrial processes and plants.

One of the objects of the present invention is to provide an improved automation system in which the above difficulties and disadvantages are overcome and largely eliminated.

Another object of the present invention is to provide an automation system including an improved conveyor whereby a group of different stations or machines can be united or organized by the use of such a conveyor into a single automatically operating system, and more than one operation can be performed on the workpieces in different stations or by different machines comprised by the group.

A further object of the present invention is to provide an automation system of the character specified in the preceding paragraph irrespective of the fact of whether the system comprises a plurality of machines, with only one machine of a kind or several machines of a kind or a plurality of several kinds of machines.

A still further object of the present invention is to provide an improved automation system for hot-running tests of automobile engines, which system performs not only such hot-running tests of the engines but also one or more additional operations and in stations different than those who perform therein hot-running tests of such engines.

A still further object of the present invention is to provide an improved automation system for performance therein of engine testing operations, with the engines carried by the conveyor being yieldingly connected to such conveyor in order to be held stationary at substantially any place on the conveyor without stopping the conveyor itself.

A still further object of the invention is to provide an improved automation system for testing automobile engines, with such system including a conveyor adapted to carry a plurality of workpieces thereon and providing for stopping some of such pieces without stopping the conveyor, as well as for accumulation of workpieces such as automobile engines behind the stopped engines in the form of a "crowd" of any practical number of such engines while the conveyor continues to run without causing any breakage or exerting undesirable forces on the conveyor or on the workpieces.

A still further object of the present invention is to provide an automation system specified in the preceding paragraph with the conveyor thereof having means adapted to pick up and move the stalled pieces immediately upon removal of the force which kept them stationary.

A still further object of the invention is to provide an automation system adapted to perform hot-running tests on automobile engines, and in addition thereto to have separate stations to perform operations such as balancing engines, directing engines to repair stands, checking repaired engines, taking out oil switches and sending the engines to repair stands and performing any practicable number of operations preceding or following hot-running tests of the engines.

A still further object of the present invention is to provide an automation system specified in the preceding paragraph in which such operations and stations may be operatively arranged in a conveyor of practicable length rather than in conveyors which have their lengths increased for the purpose of adopting it to perform such functions to an unreasonable degree.

A still further object of the present invention is to provide a system of the above nature which is relatively simple in construction, is safe and dependable in operation, and is relatively inexpensive to manufacture and easy to operate and to service.

It is an added object of the present invention to provide an improved method for automating industrial plants whereby a group of machines and devices formerly operated as independent units are organized into a single group connected by non-positive accumulator conveyors causing such groups to operate, in effect, as unitary installations or single systems.

Further objects and advantages of this invention will be apparent from the following description and appended claims, reference being had to the accompanying drawings forming a part of this specification, wherein like reference characters designate corresponding parts in the several views.

FIG. 11 is an elevational view partly in section showing an engine in position of registry with the test stand and ready to go in.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawings there is shown, by way of example, an automatic installation including a plurality of various operational stands, test stands and the like adapted to perform on automobile engines, subsequent to completion of their assembly, a plurality of different operations such as filling the engine with flushing oil, balancing the engine and flushing it with lubricating oil and/or performing some other pre-running operation, performing hot-running tests, grading the engine to indicate those engines which did not pass the hot-running test, removing disqualified or rejectable engines through the back of the test stand in order to prevent its return to the accumulator conveyor, or returning the disqualified engines to the accumulator conveyor for removal therefrom on a branch conveyor which may be serving several of the test stands, sending the rejected engine to repair stands, and the like. It should also be understood that in accordance with the present invention the same automatic system or installation may handle also workpieces other than automobile engines but simultaneously with such engines, and automatically transfer such workpieces to other stands or machines served by the same accumulator conveyor.

It should be understood further that an important prerequisite for constructing such an installation which, in effect, operates as a single unitary machine, is the provision of an accumulator conveyor which engages the workpieces for bodily movements by friction or in some other non-positive manner, permitting the workpieces such as engines to be stopped substantially at any place on the conveyor without stopping the conveyor itself and have a plurality of other workpieces accumulating behind such stopped workpiece.

Figure 1:
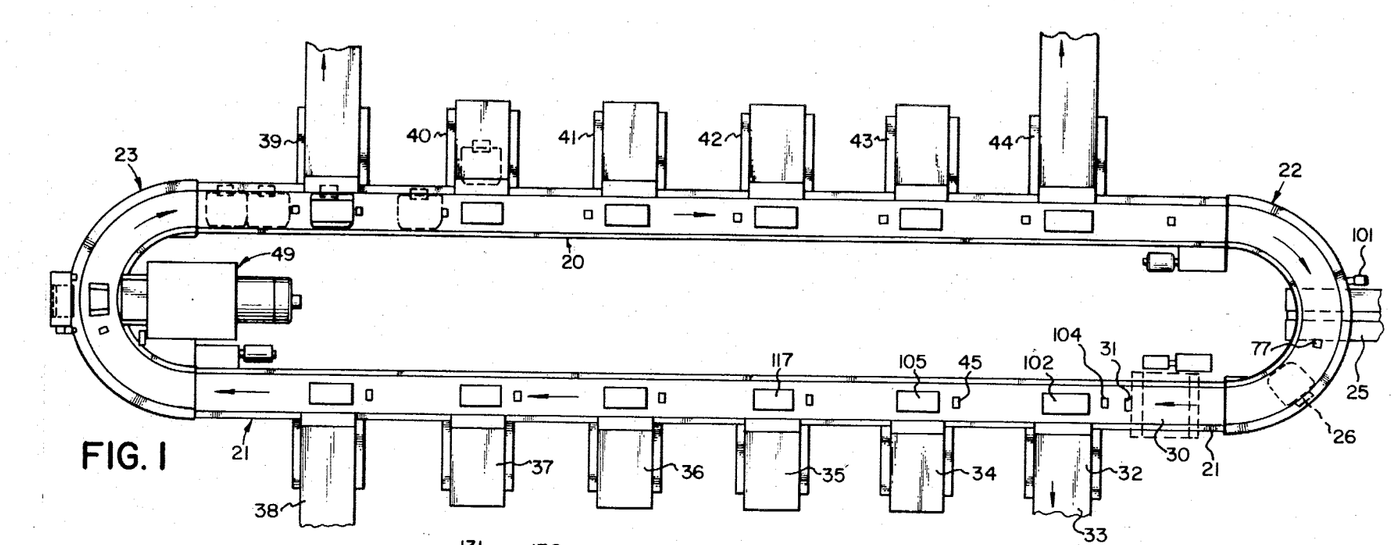
FIG. 1 is a diagrammatic plan view illustrating arrangement of various machines, test stands and rejection stands, combined with an accumulator conveyor system and thus made into a unitary installation operating, in effect, as a single machine.

In FIG. 1 some of the various stations and machines disposed adjacent the accumulator conveyor are shown in different outlines, with such outlines intended primarily to indicate that the respective stations or machines are different and that the operations performed therein are not similar or identical, rather than to show a true outline of such a station or machine.

It should also be understood that the workpieces or adaptor plates carrying workpieces such as engines need not travel past all of such stations but may be operated upon in the stations or machines which are the first in line and upon having been operated upon in such station be removed therefrom through the back of the station.

Referring specifically to the drawings, and particularly to FIG. 1 thereof, there is shown therein a closed conveyor comprising straight sections 20 and 21 arranged parallel to each other and having their ends connected with the aid of two semicircular sections 22 and 23 to provide an enclosed or endless conveyor. The direction of the movement of the conveyor in the embodiment illustrated is in the clockwise direction, with the other portions of the conveyor where direction of the movement is important being correspondingly arranged. It will be understood, however, that arrangement of the system to have the main conveyor run counterclockwise may also be used.

In the embodiment illustrated, the engines are loaded at the loading station 25. Should the engines or other workpieces have flat bottoms whereby they can rest firmly on the conveyor or are otherwise adapted or capable to do so, they can be placed on the conveyor directly. However, in cases where the engines or workpieces have non-flat or articulated bottoms, specially designed adaptor plates having their lower surfaces flat and upper surfaces adapted to receive and hold the engines securely in place may be used. In the present embodiment, the engines are designated by the numeral 26 and the engine adaptor plates by the numeral 27.

It will be understood that any desired order or sequence of operations may be used. However, it is preferred that certain initial operations should be performed first. This is particularly desirable for some special pieces the number of which is relatively small and the operation is short, in order that such pieces be operated upon at the initial or first station or stations and not be carried past all of the stations but be removed from the conveyor as soon as their operations are completed. Removal of such workpieces may be through the back of their respective stations. Such removal may be with the adaptor plates since such workpieces after their removal to the back of the station may travel considerable distances on other conveyors.

In the present exemplary embodiment, the first operation on an engine such as 26 is performed in the first station indicated by the numeral 30. Such station may be provided directly on the conveyor and include stopping means such as 31 described in detail later and means to fill the stopped engine with flushing oil.

The second operation performed in the station designated by the numeral 32 may be a cold running test to balance the engine. The manner in which the engines intended for balancing are transferred into the station 32 and are returned to the conveyor section 21 is substantially similar to those used in the hot-running test stations which will be described in detail below. However, it is desirable to remove the engines which are disqualified in the balancing operation through the back 33 of the test stand 32 in order to prevent such engines to be subjected to the hot-running test or to clog the conveyor unnecessarily by making such engine travel past all the stations back to the unloading station such as 25.

Stations 34, 35, 36 and 37 may be stations in which a hot-running test is performed. The number of such stations is usually larger than that of other stations since the hot-running test takes more time in setting the engine and making various connections, as well as in the duration of the running of the engine in the process of the test. The station 38 which may be the last station on the straight conveyor section 21 may be the station adapted to receive rejected engines and to remove them through the back of the station to repair stands at which the engines are inspected, repaired if practicable, and, if otherwise satisfactory, be returned for retesting. Although such retesting may be made in the same installation by loading the repaired engine at the station 25, it is preferable to do such retesting in a special installation.

Thus, the station 38 serves the hot-running test stations 34–37. The number of the hot-running test stations served by one reject removal station depends on the number of the engines likely to be rejected on the basis of prior exprienece. Such number may be much greater than four stations as illustrated in FIG. 1. However, it is desirable to limit the number of the hot-running test stations to such number that one such station would have ample capacity to prevent rejected engines from traveling around the entire conveyor. It may be desirable to have two reject removal stations, such as 38, side by side in the case of unusual number of rejects occurring because of some difficulty on the engine production line. If desired, one of such stations may be taken out of operation by making its limit switches inoperative. In the case when it is noted that some rejected engines began circulating or accumulating on the conveyor, such reject removal station may be put back in operation in order to pick up and remove all of the rejected engines and to prevent their further circulation or accumulation. The stations 39, 40, 41, 42 and 43 provided on the straight conveyor portion 20 may be either the same as stations 34–37 or be stations adapted to test other engines such, for instance, as truck engines. In such a case the station 39 may be a balancing station for such truck engines, with removal of the balance-disqualified engines through the back of the station with the stations 40–43 being hot-running test stations. The station 44 may serve the stations 40–43 with respect to the engines rejected in the hot-running tests in these stations, while removing such engines to repair stands, with or without returning the adaptor plates to the conveyor.

It will be further understood that stopping of the engines in registry with their respective stations may be done either by hook means described in detail below or by lifting them with their adaptor plates by elevators which do not move bodily with the conveyor. Furthermore, stopping of the following engines or other workpieces may be done either by such following engines or workpieces contacting the raised elevators, or by additional hook means.

Adjacent the semicircular section 23 there is provided a test stand for dynamometer testing of the engines, which stand is generally designated by the numeral 49 and which is adapted to receive and to dynamometer-test all or some of the engines handled by the conveyor. While the test itself performed in this stand is different than any of the tests or operations performed in other stands of the installation, the means for transferring the engines to such stands and to remove them therefrom may be similar to those used in the hot running as well as balancing tests.

An important feature of construction of the accumulator conveyor is found in the ability thereof to engage the workpieces or their adaptor plates for bodily movement by frictional, i.e., in a non-positive manner, and, therefore, providing for stopping the workpieces, in the present embodiment automobile engines, both those to be tested or those already tested and returned on the accumulator conveyor, at any place on the conveyor without stopping the conveyor itself. The conveyor is thus adapted to pick up and to move such engines further on with the conveyor as soon as the force holding the engines is removed or is made ineffective. In the straight portions of the conveyor, such means are exemplified by transverse shafts which are bodily moveable to carry the workpieces, i.e., the engines, without rotation but to begin rotating, because of the provision therein of yielding means such as slip clutches, when the engine is stopped on the conveyor with such frictional slip clutches or other yielding means stopping rotation of the shafts and engage them frictionally by the shafts' outer surfaces to carry the workpieces on with the conveyor. It should be understood, however, that in the straight section use of the means similar to the means used in the curvilinear sections described below may also be used under some conditions.

In the curvilinear portions of the conveyor in which arrangement of flexible connectors such as chains presents difficulties, the shafts arranged transversely of the conveyors are bodily stationary irrespective of whether the engines move with the conveyor or are stopped thereon but are made to rotate and to carry the engines on when they are free to do so, but to stop rotating and permit their similar slip clutch means to slip when the engines are held stationary on the conveyor.

Figure 3:
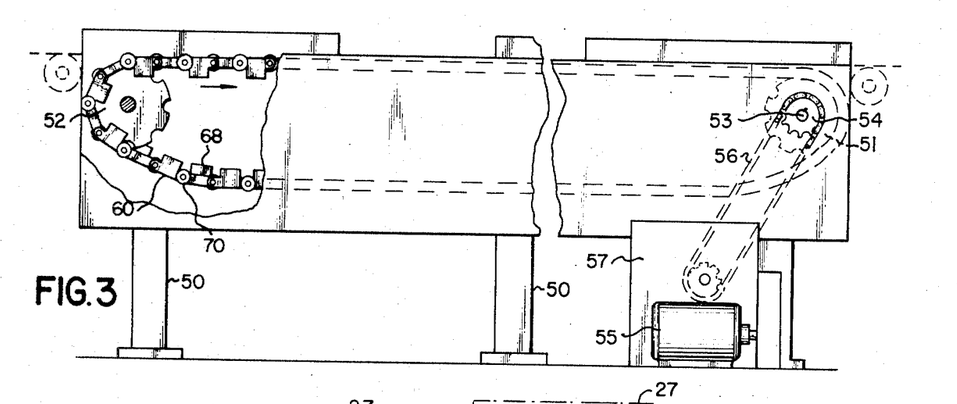
FIG. 3 is an elevational side view of the straight section of the conveyor with the driving means therefor being indicated thereon and the middle section of the construction being broken away for compactness of the drawing.
Figure 4:
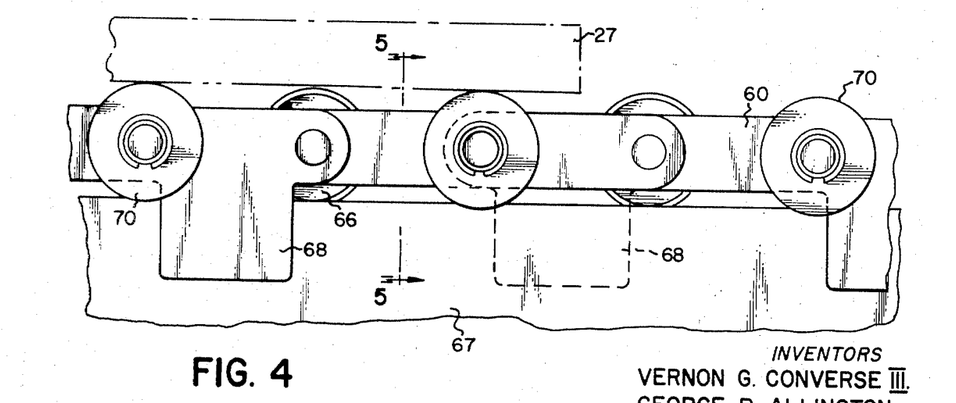
FIG. 4 is a fragmentary elevational side view showing a portion of the straight conveyor chain on a larger scale.

Referring specifically to FIGS. 3-4 of the drawings illustrating construction of one of the straight sections, the same comprises a frame work generally designated by the numeral 50 on which there are mounted two pairs of sprocket wheels 51 and 52. The sprocket wheels 51 are mounted on the shaft 53 supported in suitable bearings and carrying a smaller sprocket wheel 54. Both wheels 51 and 54 are keyed to the shaft 53. A motor 55 drives the wheel 54 through a chain drive 56 and a reducing gear device 57. Chains 60 and 61 of identical construction are passed over the sprocket wheels 51 and 52 of each pair thereof and are driven by the sprocket wheels 51, with the sprocket wheels 52 being idlers.

Figure 10:
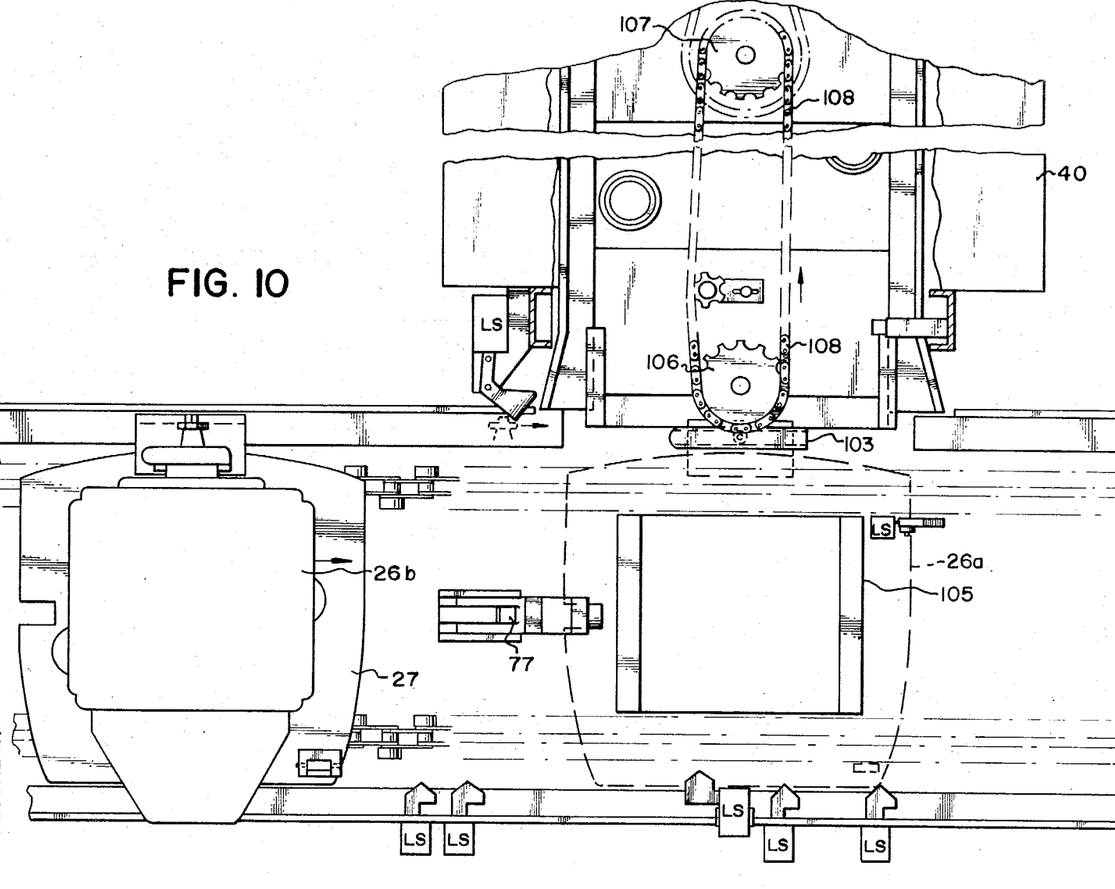
FIG. 10 is a plan view of a test station and of the adjacent portion of the accumulator conveyor with an engine in the position of registry with the station and ready to go into the test station being shown in phantom lines in order to expose portions of the construction which otherwise would be covered by the engine.
Figure 11:
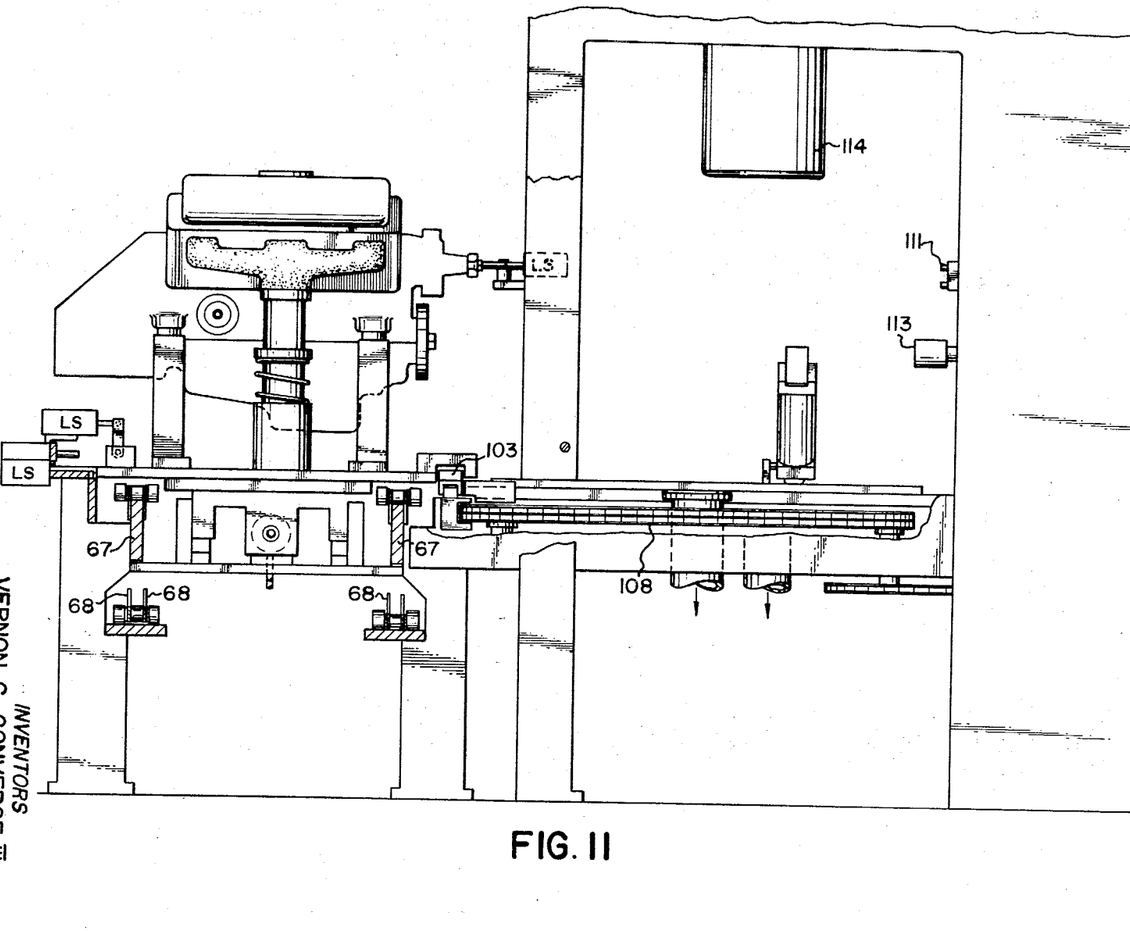
Figure 12:
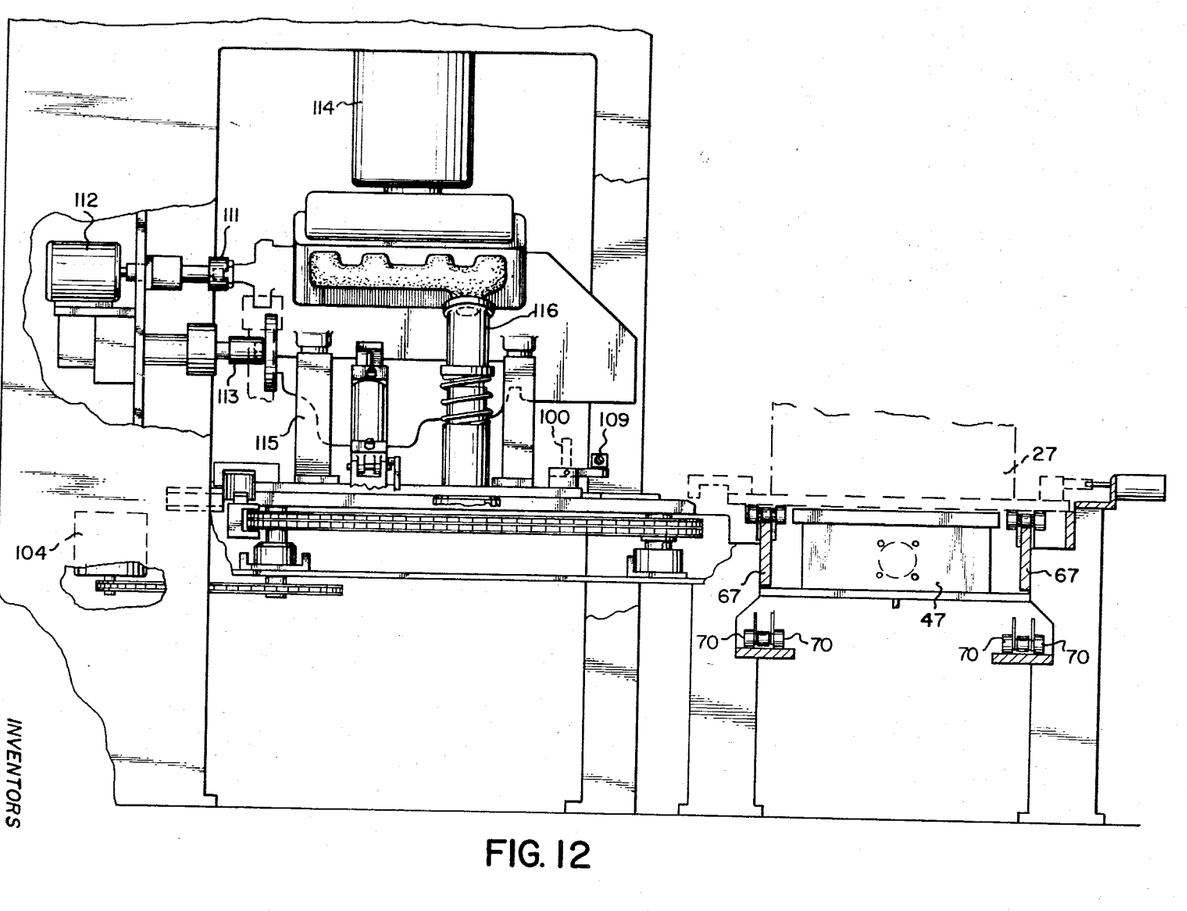
FIG. 12 is a view similar to FIG. 11 but showing the engine transferred into and set in position in the test stand.

Each of the two chains 60 and 61 is arranged in a vertical plane, with said planes being parallel to each other, as is best shown in FIGS. 10, 11 and 12. Said chains 60 and 61 carry a plurality of roller assemblies including rollers spaced sufficiently close to each other to support the workpieces at each chain in a desired manner.

Figure 5:
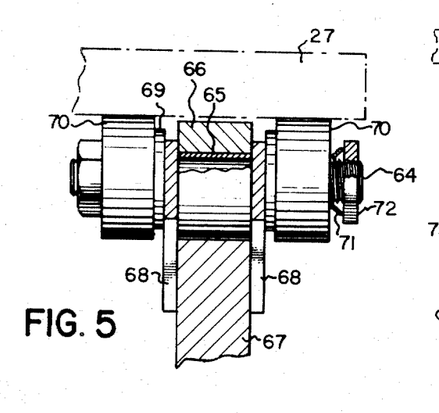
FIG. 5 is a fragmentary sectional view taken in the direction of the arrows on the section plane passing through line 5—5 of FIG. 4.

Each roller assembly comprises a short shaft 64 carrying a bearing bushing 65 press fit on the shaft 64 at the middle thereof and having a track roller 66 rotatably mounted thereon to run on the rail 67 and thus to support the chain. Links 68 are disposed on opposite sides of the roller 66 and the rail 67 and bear on the bearing bushing 65 which operates as a spacer member for said links 68. Friction rings 69 are disposed on both sides of said roller 66 between the links 68 and the workpiece-supporting rollers 70. A Belleville spring or a wave washer 71 and an adjustment self-locking nut 72 are provided on each end of the shaft 64. Adjustment self-locking nuts 72 are adapted to hold the rollers 70 against the friction ring 69 with adjustable amount of pressure, to restrict freedom of rotation of the rollers 70 on the shaft 64, thus forming, in effect, friction slip clutches. The shafts 64 form hinges for the link units of the chains, permitting said chains to go over the sprocket wheels.

The chain-supporting rollers 66 are always free to rotate and thus to permit the chains to move on rails 67 without excessive friction. Rotation of the workpiece supporting rollers 70 is, however, restricted. In carrying a workpiece or an adaptor plate such as 27, the rollers 70 move bodily but do not rotate. However, should the adaptor plate 27 or the engines carried thereon be stopped on the conveyor by some extraneous force, the conveyor chains continue to move, and thus cause the rollers 70 also to move bodily, with the friction between the peripheries of the roller 70 and the bottom surface of the adaptor plate 27 being sufficient to overcome the adjusted frictional resistance of the friction rings 69 and thus to produce sufficient torque to cause the rollers 70 to rotate and to roll out from under the adaptor plate 27 one by one. However, as soon as the force holding the adaptor plate 27 in place is removed, the frictional resistance afforded by the friction rings 69 stops rotation of the rollers 70 in contact with the adaptor plate 27, and the same is again carried by the conveyor.

It will now be understood in view of the foregoing that the engines carried by the conveyor can be stopped at any position thereon by exerting a holding force either directly on the engine or on its adaptor plate. Stopping and holding of the engine or its adaptor plate 27 does not stop forward movement of the conveyor or movement of the other workpieces carried thereby until the next piece behind the stopped workpiece or adaptor plate reaches a position at a predetermined distance behind the same or in contact therewith and is similarly stopped and held in place. If the engines so stopped are held for a longer time, more and more engines accumulate behind them, and, in fact, all engines carried by the conveyor can accumulate in one place behind the second stopped engine and stay thereat without stopping the conveyor if the stopped engines are held in place long enough.

Figure 6:
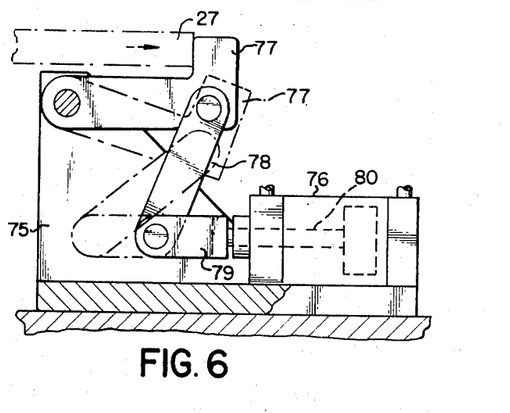
FIG. 6 is a view partly in section showing hook stop means adapted to engage and to stop engine-receiving adaptor plates, and actuating means for such stop means.

Means adapted to stop the engines on the conveyor are exemplified by the stop-hook means best illustrated in FIG. 6. Said means comprise a frame 75 on which there is operatively mounted a fluid operated cylinder-and-piston assembly 76 adapted to operate a stop-hook 77 with the aid of a link 78 hingedly connected thereto and to the head 79 secured to the end of the piston rod 80. In FIG. 6 retracted position of said stop-hook means 77 is shown in dot-and-dash lines. As soon as an engine, the movement of which had to be interrupted for transferring such engine to a working station or sorting branch conveyor, reaches a certain position on the conveyor, it actuates a suitable limit switch, causing the fluid cylinder 76 to be operated and the piston rod 80 to be moved into its retracted position. In consequence thereof, the stop-hook 77 is moved into its position shown in FIG. 6 in solid lines, thus stopping the engine and its adaptor plate 27 and holding same in place. If stopping the next following, i.e. the second engine, is necessary, this may be accomplished by similar stopping means. Stopping means of such nature are provided on the conveyor adjacent the stations in order to stop desired engine or other workpiece in front thereof for disposition.

It will be understood that with several kinds of engines or other workpieces being carried by the conveyor the limit switches actuated thereby at proper stations are specially adapted to be actuated only by that particular type of engine or its adaptor plate, or other workpiece, and not by any other one, permitting all other engines or other workpieces to pass by and be stopped only at those stations at which the switches are of the corresponding nature.

Such results can be attained, for instance, by locating the limit switches at such different elevations as to cause them to be engaged and operated by protruding parts of the engines, or parts of the adaptor plates, located at the same respective elevations and be missed or cleared by protruding parts of the engines or other workpieces located at different elevations and intended to operate limit switches at other stations adapted to receive different engines or workpieces. The protruding parts of the engines or other workpieces used for such purposes may be those already present in such engines or other workpieces and forming original parts thereof, or they may be pieces attached to the adaptor plates to perform such intended functions and be removed therefrom or put in a retracted or ineffective position after they serve their purpose. Retracting such limit switch operating pieces may be done manually or automatically.

It should be understood that limit switch means do not "sense" presence of an engine or other intended workpiece in a position of registry with the intended station or other device but operate by being tripped by the moving engine or its adaptor plate, and, therefore, the engine must pass through a certain portion of the conveyor before it reaches a position of registry. Placing such engines from above into a position of registry would not be operative to trip the limit switch and cause the sequence of predetermined events at that station. Provision of truly "sensing means" at such station, such as electric eyes, may or may not be operative since their "sensing" function would depend merely on interruption of a light beam by an engine, and such interruption may be caused by any one of the engines or workpieces. Generally, use of electric eyes would require more clearance between the separate light beams, and therefore electric eye means may be applicable to larger engines or other workpieces only.

In the present embodiment, the straight conveyor sections do not include long movable shafts or other members extending transversely between the chains 60 and 61, since such cross members could strike the stop hook 77 and stop the conveyor when the stop-hook device is actuated. The chains 60 and 61 are bound laterally by the rails 67 held together rigidly with the aid of cross members 47.

In the present embodiment, the straight conveyor sections include two parallel rails such as 67, with each rail carrying the chain such as disclosed above, each chain being arranged in a vertical plane. The roller assemblies of the chain 61 are identical to those of the chain 60. It should be understood, however, that as is best shown in FIG. 5, there are no transverse members extending transversely of the conveyor between the chains 60 and 61 at the level thereof and connecting such chains together. Provision of such cross members is undesirable since they could strike the stop-hook means 77 and stop the conveyor when the stop-hook device is operated, as mentioned. The chains 60 and 61 are bund laterally by the rails 67 which, in turn, are connected by the cross members 47 which are disposed considerably lower than the operative parts of the stop means and which are, of course, stationary on the conveyor similarly to the rails 67.

When the engine, together with its adaptor plate, is removed from the conveyor for working thereon in a test station or other apparatus, and the space occupied by it becomes vacant on the conveyor, actuation of another limit switch causes the fluid cylinder 76 to be operated and moved into its extended position, thus moving the stop-hook 77 into its retracted position. Thereupon, the rotating rollers stop rotating and immediately pick up for bodily movement the engine adaptor plate or other workpiece which was held in place thereon and carry it further on the conveyor to its intended destination. Should this be an untested engine, its movement past an unoccupied test station would operate a limit switch causing transfer of such engine to the test station. The limit switches of occupied test stations would not be affected by movement of any engines or workpieces past such occupied station.

The curvilinear sections of the conveyor system, which sections in the present embodiment are semicircular, are composed of a plurality of bodily stationary but rotating shafts which carry the workpieces because of the friction between the roller elements provided on the shafts and the bottom surfaces of the adaptor plates. Said plates, because of their weight, exert downward forces on the peripheral surfaces of such roller elements, causing frictional engagement. The individual shafts are yieldingly driven and therefore when an engine carried by its adaptor plate is stopped on the conveyor by exerting a holding force thereon, the shafts cease rotating and the slip frictional clutches provided therein begin slipping, allowing the engines thus affected to remain stationary on the conveyor but permitting continued rotation of all of the remaining individual shafts and moving of the engines supported thereby, except those held stationary.

Figures 7, 9:
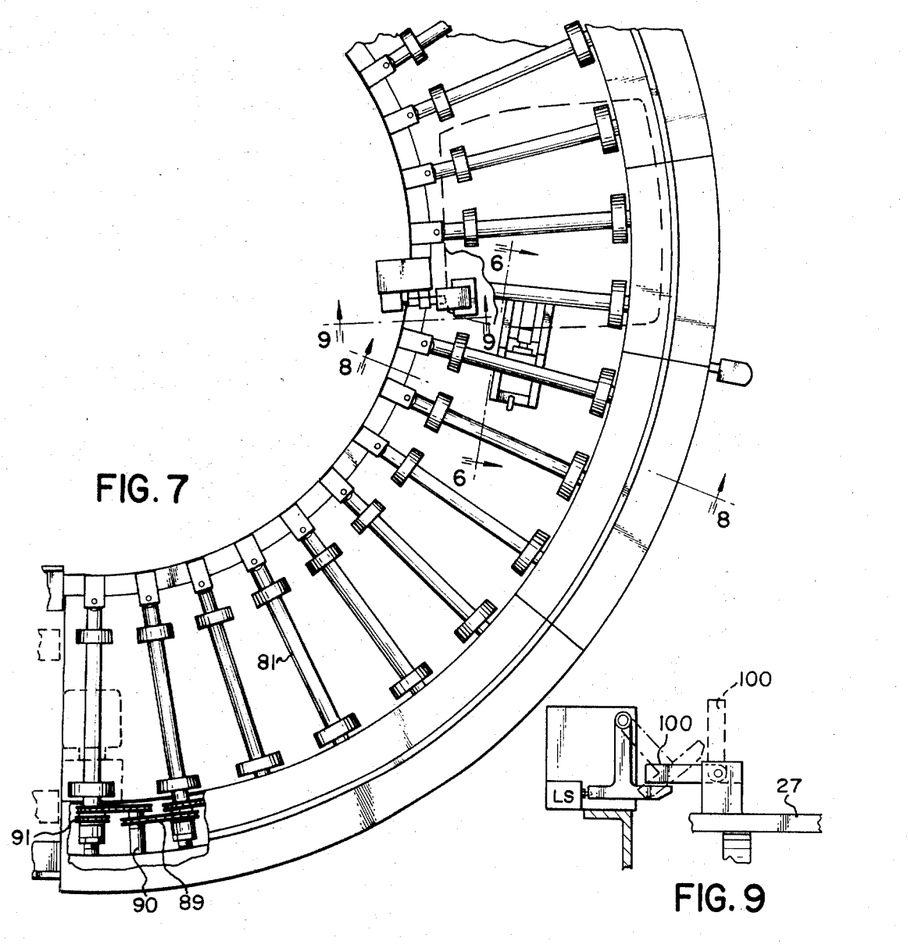
FIG. 7 is a fragmentary plan view showing a portion of one semi-circular conveyor, two of which are provided at the ends of the two straight conveyors to produce an enclosed conveyor.
FIG. 9 is a signal device provided on the engine-receiving adaptor plates and adapted to be manually set and reset for giving proper signal to the work stations or other apparatus performing operations on the engines.
Figure 8:
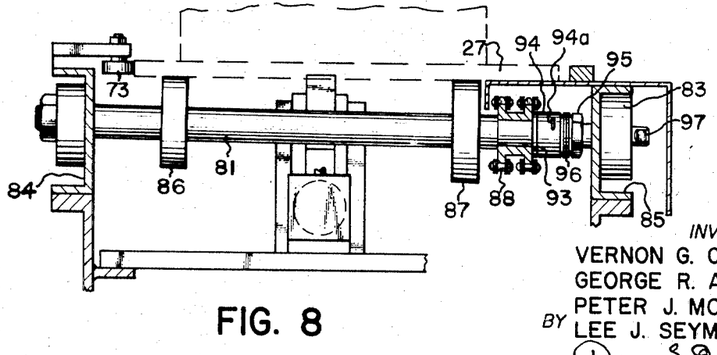
FIG. 8 is a sectional view taken in the direction of the arrows on the section plane passing through the line 8—8 of FIG. 7, and showing one shaft on a larger scale.

Each semicircular section comprises a frame best illustrated in FIG. 7, in which there is operatively mounted a plurality of shafts 81 such as shown in FIG. 8, wherein one individual shaft 81 is shown on a larger scale. As shown in FIG. 7, the shafts 71 are disposed in radial directions with respect to their semicircular section. Referring particularly to FIG. 8, the shaft 71 is journaled in the bearings 82 and 83 mounted on channel members 84 and 85 of the frame. The shaft 81 has formed thereon roller-like enlargements 86 and 87, with enlargement 87 being of larger diameter than the enlargement 86 in order to direct the engines with their adaptor plates around a curve rather than cause them to move on a straight path. The engines are thus made to follow the curvilinear path. The guide rollers, such as 73, are provided on the inner channel member as a safety feature. In the present embodiment the guide rollers 73 may be contacted by the adaptor plates carrying the engines.

Each shaft 71 carries a double sprocket wheel 88 rotatably mounted on the shaft and drivingly connected with the aid of individual chains such as 89, see FIGS. 7 and 8, with the sprocket wheels of the adjacent shafts, with the countershafts 90 being interposed inbetween, to compensate for the effect of angularity of shaft arrangement. Suitable driving means, which may be in the form of an electric motor, drive the first shaft, lowermost in FIG. 7, with the aid of a suitable chain 91. Generally, if an electric motor is used as driving means, a reducing gear device is also employed.

Means are provided to drive the shafts yieldingly, exerting thereon only such driving torque as is necessary to move the adaptor plates with the engines carried thereby but to slip should any such engines be stopped on the conveyor or some extraneous force. Such yielding means are exemplified by a frictional slip clutch provided on each shaft. Such clutch is formed by a frictional member or disc 93 held between the sprocket member 88 and a bushing 94 pinned to the shaft as indicated at 94a. An adjustment self-locking nut 95 is provided on the threaded section of the shaft. Belleville or wave washer springs 96 are provided between the bushing 94 and the adjustment nut 95 in order to extend the range and the sensitivity of adjustments. By operating such nut, any desired pressure may be exerted on the friction member 93, and thus any desired intensity of driving friction may be produced between the sprocket member 88 and the bushing, ensuring production of desired torque or limiting it to any desired value. A flat portion 97 is provided on the end of the shaft in order to hold it with the aid of a wrench when the nut is being adjusted. Preferably a suitable torque wrench is used for such adjusting operation. Since the double sprocket members 88 are free to rotate on the shafts, all shafts on the semicircular section can remain stationary, i.e. non-rotating, with all of the driving chains operating.

Suitable stop means, which may be similar or identical to the stopping devices provided on the straight sections, are provided in one or more places on the semicircular sections for stopping the engines or other workpieces for desired operation or for unloading a tested engine and loading a new engine or workpiece in the place of an unloaded one.

Proceeding now to describe the progress of one engine on the conveyor, reference is made to the loading and unloading station 25 appearing on the right-hand side of the plan view of the conveyor system of FIG. 1. An engine such as 26 comes to the loading station in any suitable way, such as on an overhead conveyor from which it is loaded with the aid of a suitable hoist, or on a level branch conveyor from which it can be slid manually into place, or pulled in by an automatically operating hook. Since the bottom of the engine is not flat, an adaptor plate is used, which plate may be the one from which a tested engine has just been taken off. For such a procedure it may be advantageous to remove the tested engines on the level conveyor and to lower the engine to be loaded from the overhead conveyor and thus to avoid possible interference between the engines.

Stop-hook means such as 77 may be employed to stop movement of the tested engine coming to unloading station 25, or an elevator plate operated by a suitable limit switch means may be used. After removing the tested engine and sending it off on the level conveyor or similar means, the operator loads the new engine on the adaptor plate 27 and sets up the signal bar such as 100 provided on the adaptor plate, which would thus identify the adaptor plate as one carrying an untested engine. Thereupon, the operator presses a foot pedal, such as 101, which releases the hook means 77 causing the rotating shafts 81 to move the engine 26 along the conveyor. The rotating shafts of the semicircular section 21 transfer the engine 26 with its adaptor plate to the right end of the straight conveyor section 21 from which it arrives after traveling only a short distance to the station 30 and is stopped thereat by the hook-means designated by the numeral 31, which may be similar or identical to hook-shape stop means 77. At this station the engine 26 is filled with the flushing oil.

When filling the engine with oil is completed, the limit switch, which may be operated by the oil filling device, releases the hook means 31 and the engine 26 proceeds to the balancing station 32. Transferring of the engine into the test station 32 is accomplished in the following manner. Approaching the station 32, the adaptor plate or the engine itself operates a limit switch, which operation may be performed by the signal bar 100. In consequence thereof, an elevator plate designated by the numeral 102 is raised above the level of the conveyor and a hook means similar to that designated by the numeral 103 in FIG. 11 pulls the engine with its adaptor plate off the elevator plate into the balancing station or stand. Suitable locating blocks locate the engine in a proper position in the balancing stand, whereupon fastening means, preferably fluid operated, fix the engine in place. The engine is then connected to balancing means of any suitable nature, and the balancing operation is performed in accordance with a predetermined procedure.

If any balance defects are detected in the engine in the process of balancing procedure, the engine is disqualified from returning to the conveyor and is removed to a repair stand preferably through the back of the station 33. This particular feature of our improved system is of importance since returning a disqualified engine to the conveyor would cause such an engine to travel through a substantial portion or the entire length of the conveyor, thus reducing the productivity of the system. In addition it would require the conveyor to be adapted not to have any other stations respond to the movement of such engine.

It will be noted that while the elevator plate 102 is in its raised position, the hook means such as 104 is in its raised position and holds further engines or other workpieces in place. Under certain conditions, the elevator plate 102 may be utilized to hold the oncoming engines or workpieces. Such a construction may be built-in into the system or the limit switch operating the hook means 104 may be disconnected and made ineffective.

Presuming that the engine, the progress of which from the loading station 25 has been described, is disqualified and is removed from the conveyor, the next engine which was following the disqualified engine and was balanced would proceed further on the conveyor as soon as the elevator plate 102 was lowered and would reach the elevator plate 105 of the station 34. The station 34 is a hot-running test station, and its construction is similar or identical to that of the station shown in detail in FIGS. 10, 11 and 12.

Referring to FIG. 10 in which a similar station is shown in plan view, it will be seen that an untested engine is shown therein in position of registry with the test station. Such engine is shown in outline only in order not to obscure the elevator plate 105 and the hook means 77. The pulling-in hook means 103 is now ready to pull the engine into the test station or stand. Such means are operated with the aid of two sprocket wheels 106 and 107 connected by a chain 108. A special limit switch operated by the moving engine, or its adaptor plate signal bar 100, operates a switch or rotating device, such as an electric motor 104, which causes rotation of the sprocket wheel 107 pulling the engine in place. As the engine goes in, a block 109 trips the signal bar 100, thus eliminating identification of the engine as untested engine. In reaching its place in the stand, the engine brings its water pump shaft into engagement with the jaw connector 111 operated by a rotating device such as an electric motor 112. Similarly, a starter motor shaft engages the front end of the crank shaft through a connector 113. Carburetor carrier 114 is lowered on the intake manifold of the engine. Water supply connection 115 and exhaust connection 116 are made by suitable, preferably fluid-operated means. The starter motor is then operated to start the engine and the same is run in accordance with the predetermined procedure.

While the engine 26a is being tested in the station 34, the next following engine passes the station 34 and proceeds toward the station 35 which is the next station for hot-running test. If the station 35 is vacant and can receive the engine 26b, which fact would result from operation of the suitable switch means by the engine removed to the conveyor after the test, the elevator plate 117 will be raised stopping the engine and preparing it to be removed into the station 35, as described above.

If the engine tested in the station 34 passes the test, it is released from the station by the inspector actuating a special switch. This sets in operation means disconnecting the engine from the service devices described above, draining the water and the oil from the engine for reconditioning and reuse, raising the elevator 105 as well as stop-hook means 45 at the station 34. This stops movement of engines and of other workpieces which were approaching the station 34. The hook means 103 is operated to push the tested engine on the elevator. Thereupon, the stop-hook means 45 and the elevator 105 are lowered causing the plate adaptor of the tested engine to rest on the supporting rollers 70 and be moved therewith on the conveyor. Since identification of the engine as untested engine has already been eliminated by lowering the signal bar 100 as explained above, further movement of the tested engine along the conveyor toward the unloading station 25 cannot result in actuating the limit switch means of any of the hot-running test stations which are ready to receive an engine for a test, and therefore the tested engine reaches the station 25 "unclaimed" by any test station and is unloaded in a manner explained above.

Stations 36 and 37 are hot-running test stands and operate similarly to stations 34 and 35. Presuming that in one of said stations the engine does not pass the hot-running test, such engine is disqualified, and a suitable signal member on the engine or its adaptor plate is then set by the inspector in a position to operate the signal switch of a removal station 38.

It will be understood at this point that since the back of hot-running test stations includes various service devices such as water pump operating motor, a starter motor, and other service devices, removal of the disqualified engine through the back of such test stand would require producing a test stand construction including complications in its construction. Accordingly, a special removal station such as 38 is provided in which the engine-receiving means are substantially the same as in the hot-running test engine station but the station itself includes a conveyor which may be continuously operating for the purpose of carrying away the disqualified engine to the repair stands or other destination as soon as such engine is transferred to such station.

It will be seen that a removal station 38 services the test stands 34–37 or any other suitable number of hot-running test stations. By virtue of such a construction, the disqualified engines are not traveling around the entire conveyor and past all the stations but are removed almost immediately after their disqualification, thus relieving the conveyor from carrying engines, the further presence of which on the conveyor is not desirable. Any suitable number of removal stations may be provided in the system. It is preferred to have sufficient number of such removal stations in order to prevent clogging the system with rejected engines, which condition may occur because of some difficulty in the assembly operation or operations preceding the same. One of several removal stations may be switched off when only a few engines are expected to be rejected and switched on again if the number of rejected engines suddenly increases. The removal engines can be directed to repair stands from where they can be directed to the loading station 25 for retesting.

Figures 2, 2A:
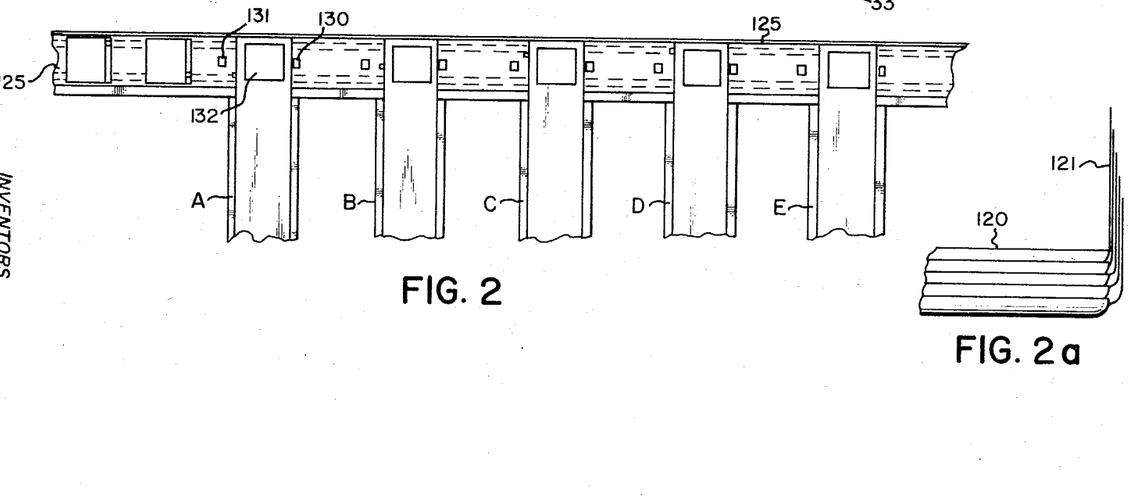
FIG. 2 is a diagrammatic plan view illustrating a sorting installation including a plurality of branch conveyors with accumulator conveyor system operating, in effect, as a single machine or system, operating to sort the items received by the conveyor into five groups, with each article being transferred to a branch conveyor adapted to deliver the selected articles to five different destinations.
FIG. 2a is an elevational view showing a stack of workpiece-carrying pans.

The construction illustrated in FIG. 2 is a sorting conveyor. It is a non-positive conveyor similar in its construction to the conveyor of FIG. 1 but serving only branch conveyors the function of which is to sort the workpieces carried thereby into a predetermined number of groups according to their nature by removing such workpieces to separate destinations.

Sorting is accomplished by providing at each branch conveyor a limit switch which can be operated only by workpieces intended to be transferred to the particular branch conveyor and to no others. If the nature of the workpieces permits, such limit switches, or other responsive means, can be operated by the workpieces directly. Otherwise, special pans with upwardly protruding standards of different heights may be used. Branch conveyors have their limit switches arranged at corresponding elevations to be actuated by the standards.

Construction of such nature may be used, for instance, in airports serving a considerable number of airlines for handling the baggage or items of freight. Each airline may have a separate conveyor operatively arranged as close as practicable to the point of aircraft arrival. Such conveyor has at its receiving end a supply of stacking pans 120 each having a standard 121 of a predetermined height. Such a stack is shown in FIG. 2a. As the aircraft comes to a full stop, such pans are put on a smooth platform at the receiving end of the conveyor one by one, and one or more pieces of baggage or items of freight, depending on their size, are put into each pan and the pan is pushed on the moving conveyor.

Such "field" branch conveyor discharges the loaded pans on the master conveyor such as 125 which runs continuously and receives baggage from many airlines, and may be of considerable length. Field branch conveyors are operated intermittently and are stopped after delivering all unloaded baggage or freight to the master conveyor 125, or after the empty pans are returned. The sorting portion of the master conveyor is arranged in the terminal with each branch conveyor leading to the baggage claim location or freight storage of each airline.

The first branch conveyor, designated in FIG. 2 by the letter A has its limit switch arranged at the highest elevation. Such switch can be operated only by the pan having the heightest standard and such pans are in use only by the airline A. All other pans with lower standards will pass the conveyor A. The limit switch of conveyor B located at the next lower height will be operated by the pan having next lower standard and coming from the airline B, and so on.

At the respective delivery points, the baggage or freight is unloaded from the pans and the empty pans returned to the return portion of the master conveyor and carried back to the field conveyors which receive them at their sorting locations. Such pans may also be returned to the field conveyors manually by special carts.

If automatic return means are used, receiving of the loaded and empty pans is accomplished in substantially the same manner as in the construction of FIGS. 1–12. The operation of the limit switch causes operation of the hook stop means to stop the pans subject to withdrawal in position of registry with their respective conveyor together with the next following pan. This is accomplished with the aid of stop means 130 and 131 at conveyor A of FIG. 2, followed by raising the elevator 132, and pulling the pan on the moving conveyor A; thereupon the elevator of the hook means 130 and 131 are lowered to permit movement of other empty pans on the return portion of the master conveyor.

Sorting conveyors of the above-described nature may be also used in industrial plants connecting part-making facilities with sub-assembly and assembly plants or portions of such plants. Use of pans provides for sorting for the purposes of delivery to desired destinations of many types of small parts which by themselves could not be efficiently handled by the conveyors.

It should be noted that because of the non-positive nature of the improved conveyors used in the construction of the automation systems disclosed herein, the workpieces moving thereon follow in compact groups, with virtually no clearance between the workpieces in the groups, as indicated at the left-hand end of the straight section 20, thus utilizing the conveyor space to its maximum productivity. Whatever breaks occur between the groups are only those which were caused by stopping some of the workpieces to prevent interference with the operation of the various stations in receiving the workpieces and in discharging the same, and no more. Because of such operation such breaks are not uniform, since uniformity of such breaks or presence of any spaces between the workpieces not caused by the above would not only destroy the high productivity of the conveyor but would also be an indication of inefficient construction which would make the conveyor not capable of handling workpieces of different nature or having a plurality of work or test stations performing dissimilar or different operations, without increasing its length to impracticable or even totally unacceptable degree.

There is thus provided an improved automation system and a method of automating industrial plants whereby the objects of the invention listed below and numerous additional advantages are attained.

We claim:

1. In an automation system uniting into a substantially unitary automatically operating group a plurality of machines, stations, and devices performing the operation of hot-running test of automobile engines and operations incidental thereto, said system comprising in combination an endless conveyor including two straight sections and two curvilinear sections connecting the ends of said straight sections to form a closed endless conveyor, each of said straight sections comprising at least one flexible connector, driving means for said connector, a multitude of roller elements rotatably mounted on shafts extending transversely of said endless connectors, respectively, a plurality of adaptor plates carried by said roller elements and adapted to support workpieces including automobile engines, said roller elements also adapted to support workpieces having bottom surfaces adapting said workpieces to rest firmly on the conveyor, yielding means operatively interposed between said roller elements and their respective shafts to provide for rotation of said rollers and their continued bodily movement with the endless connector when one of said adaptor plates or workpieces supported by said roller elements is held stationary on said conveyor, and each of said curvilinear sections comprising a plurality of bodily stationary but rotatable shafts adapted to support items carried by the conveyor, yielding driving means for said shafts to provide for movement of the adaptor plates and workpieces carried by the conveyor but to remain stationary when said plates and workpieces supported thereby are held stationary on said conveyor, and a plurality of test stations adapted to receive from the conveyor the engines to be tested, means adapted to move the engines to be tested from the conveyor into said stations, means in said stations to subject the test engines to hot-running test, and means to return the tested engines to said conveyor, at least one stand for repairing rejected engines, at least one station adapted to receive engines rejected by the hot running tests, means to move such rejected engines to said last station, and means to deliver such rejected engines from said last station to the repair stand.

2. The automation test system defined in claim 1, and including at least one station disposed ahead of the running test station and adapted to check repaired engines and including arresting means controlled by switch means operative to arrest such repaired engines at such station and prevent them form being carried past the test stations before they are checked.

3. In an automation system uniting into a substantially unitary automatically operating group a plurality of machines, stations, and devices performing the operation of hot-running test of automobile engines as well as a number of operations incidental thereto, said system comprising in combination an endless conveyor including two straight sections and two curvilinear sections connecting the ends of said straight sections to form a closed endless conveyor, each of said straight sections comprising at least one flexible connector, driving means for said connector, a multitude of roller elements rotatably mounted on shafts extending transversely of said endless connector, a plurality of adaptor plates carried by said roller elements and adapted to support workpieces including automobile engines, said roller elements also adapted to support and carry workpieces having bottom surfaces adapting such workpieces to rest firmly on the conveyor, yielding means operatively interposed between said roller elements and their respective shafts to provide for rotation of said roller elements and their continued bodily movement with the endless connector when one of said adaptor plates or workpieces is held stationary on said conveyor, and each of said curvilinear sections comprising at plurality of bodily stationary but rotatable shafts adapted to support the items carried by the conveyor, yielding driving means for said shafts to provide for movement of said adaptor plates and workpieces carried by the conveyor, yielding driving means for said shafts to provide for movement of said adaptor plates and workpieces carried by the conveyor but to remain stationary when said plates and workpieces are held stationary on said conveyor, a plurality of test stations adapted to receive from the conveyor engines to be tested, means adapted to move the test engines from the conveyor into said test stations, means in said stations to subject said test engines to hot-running test, and means to return the tested engines to said conveyor, at least one station adapted to receive such test engines for balancing, with said last station being located ahead of the testing stations, means to move the test engines into balancing stations and to return them to the conveyor, and arresting means triggered by switch means operating to prevent the engines rejected in balancing from being carried past the running test stations.

4. In an automation system uniting into a substantially unitary automatically operating group a plurality of machines, stations, and devices performing the operation of hot-running test of automobile engines as well as a number of operations incidental thereto, said system comprising in combination an endless conveyor including two straight sections and two curvilinear sections connecting the ends of said straight sections to form an endless conveyor, each of said straight sections comprising at least one flexible connector, driving means for said connector, a multitude of roller elements rotatably mounted on shafts extending transversely of said endless connector, a plurality of adaptor plates carried by said roller elements and adapted to support workpieces including test automobile engines as well as workpieces having bottom surfaces adapting such workpieces to rest firmly on the conveyor, yielding means operatively interposed between said roller elements and their respective shafts to provide for their rotation and continued bodily movement with the endless connector when one of said adaptor plates or workpieces is held stationary on said conveyor, and each of said curvilinear sections comprising a plurality of bodily stationary but rotatable shafts adapted to support the items carried by the conveyor, yielding driving means for said shafts to provide for movement of said adaptor plates and workpieces carried by the conveyor but to remain stationary when said plates and workpieces are held stationary on said conveyor, a plurality of test stations adapted to receive from the conveyor engines to be tested and including means adapted to porform running tests on test engines, means adapted to move the test engines from the conveyor into said test stations and to return the tested engines to said conveyor; a repair stand for repairing rejected engines, a station disposed after the test stations and adapted to receive the rejected engines for directing them to repair stands, means to move the rejected engines to said last station.

5. In an automation system uniting into a substantially unitary automatically operating group a plurality of machines, stations, and devices performing the operation of hot-running test of automobile engines as well as a number of operations incidental thereto, said system comprising in combination an endless conveyor including two straight sections and two curvilinear sections connecting the ends of said straight sections to form an endless conveyor, each of said straight sections comprising at least one flexible connector, driving means for said connector, a plurality of roller elements rotatably mounted on shafts extending transversely of said endless connector, a plurality of adaptor plates carried by said roller elements and adapted to support workpieces including automobile engines, said roller elements also adapted to support workpieces having bottom surfaces adapting such workpieces to rest firmly on the conveyor, yielding means operatively interposed between said roller elements and their respective shafts to provide for their rotation and continued bodily movement with the endless connector when one of said adaptor plates or workpieces is held stationary on said conveyor, and each of said curvilinear sections comprising a plurality of bodily stationary but rotatable shafts adapted to support the items carried by the conveyor, yielding driving means for said shafts to provide for movement of said adaptor plates and workpieces carried by the conveyor but to remain stationary when said plates and workpieces are held stationary on said conveyor, a plurality of test stations adapted to receive from the conveyor the engines to be tested, means in said test stations to perform running tests on the test engines, means adapted to move the test engines from the conveyor into said test stations and to return the tested engines to said conveyor, at least one stand for repairing rejected engines, and at least one station adapted to receive engines rejected by the running test, means to move the rejected engines from the conveyor to said last station and to deliver such rejected engines to the repair stands, and means to return the empty adaptor plates to the conveyor.

6. In an automation system uniting into a substantially unitary automatically operating group a plurality of machines, stations, and devices performing the operation of hot-running test of automobile engines as well as a number of other operations incidental thereto, said system comprising in combination an endless conveyor including two straight sections and two curvilinear sections connecting the ends of said straight sections to form an endless conveyor, each of said straight sections comprising at least one flexible connector, driving means for said connector, a plurality of roller assemblies rotatably mounted on shafts extending transversely of said endless connector, a plurality of adaptor plates carried by said roller assemblies and adapted to support workpieces including automobile engines, said roller assemblies also adapted to support workpieces having bottom surfaces adapting such workpieces to rest firmly on the conveyor, yielding means operatively interposed between said roller assemblies and their respective shafts to provide for their rotation and continued bodily movement with the endless connector when one of said adaptor plates or workpieces is held stationary on said conveyor, and each of said curvilinear sections comprising a plurality of bodily stationary but rotatable shafts, adapted to support the items carried by the conveyor, yielding driving means for said shafts to provide for movement of said adaptor plates and workpieces carried by the conveyor but to remain stationary when said plates and workpieces are held stationary on said conveyor, a plurality of test stations adapted to receive from the conveyor the engines to be tested, means in said test stations to perform hot-running tests on said test engines, means adapted to move the test engines from the conveyor into said test stations and to return the tested engines to said conveyor, at least one stand for repairing rejected engines, and at least one station adapted to receive engines rejected by the hot-running test, arresting means triggered by switch means to stop the rejected engines on the conveyor, means to move the rejected engines from the conveyor to said last station and to deliver such rejected engines to the repair stands, and means to return the repaired engines to the conveyor for retesting.

References Cited

UNITED STATES PATENTS

| | | | |
|---|---|---|---|
| 1,825,038 | 9/1931 | Anderson | 198—21 X |
| 1,852,942 | 4/1932 | Streine | 198—183 |
| 1,904,837 | 4/1933 | Posey | 198—21 X |
| 2,602,536 | 7/1952 | Eggleston | 198—127 |
| 2,613,798 | 10/1952 | McPhee | 198—21 |
| 2,762,496 | 9/1956 | McCaul | 198—183 |
| 3,369,646 | 2/1968 | Musser | 198—127 |

FOREIGN PATENTS 180,387   12/1966   U.S.S.R.

JERRY W. MYRACLE, Primary Examiner

U.S. Cl. X.R.

198—19, 21, 42